United States Patent
Kobayashi et al.

(10) Patent No.: US 12,080,481 B2
(45) Date of Patent: Sep. 3, 2024

(54) MULTI-LAYER CERAMIC ELECTRONIC COMPONENT AND CIRCUIT BOARD

(71) Applicant: TAIYO YUDEN CO., LTD., Tokyo (JP)

(72) Inventors: Satoshi Kobayashi, Tokyo (JP); Kiyoshiro Yatagawa, Tokyo (JP); Takahisa Fukuda, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 217 days.

(21) Appl. No.: 17/879,276

(22) Filed: Aug. 2, 2022

(65) Prior Publication Data

US 2023/0114467 A1    Apr. 13, 2023

(30) Foreign Application Priority Data

Oct. 8, 2021    (JP) .................. 2021-166169

(51) Int. Cl.
- *H01G 4/232* (2006.01)
- *H01G 4/12* (2006.01)
- *H01G 4/248* (2006.01)
- *H01G 4/30* (2006.01)

(52) U.S. Cl.
CPC ......... *H01G 4/2325* (2013.01); *H01G 4/1245* (2013.01); *H01G 4/248* (2013.01); *H01G 4/30* (2013.01)

(58) Field of Classification Search
CPC .... H01G 4/2325; H01G 4/1245; H01G 4/248; H01G 4/30
See application file for complete search history.

(56) References Cited

U.S. PATENT DOCUMENTS

| | | | | |
|---|---|---|---|---|
| 10,658,117 B2* | 5/2020 | Kim | ......... | H01G 4/30 |
| 11,393,633 B2* | 7/2022 | Kyeong | ......... | H01G 2/065 |
| 2014/0063684 A1* | 3/2014 | Lee | ......... | H01G 4/30 |
| | | | | 156/89.18 |
| 2016/0099110 A1* | 4/2016 | Lee | ......... | C09D 5/24 |
| | | | | 252/514 |
| 2017/0345568 A1* | 11/2017 | Sakatsume | ......... | H01G 4/1236 |
| 2021/0050152 A1* | 2/2021 | Zenzai | ......... | H05K 1/092 |

FOREIGN PATENT DOCUMENTS

JP    11-162771 A    6/1999

* cited by examiner

*Primary Examiner* — Michael P McFadden
(74) *Attorney, Agent, or Firm* — Stein IP, LLC

(57) ABSTRACT

A multi-layer ceramic electronic component includes: a ceramic body having a substantially rectangular parallelepiped shape; and external electrodes each including a base layer, a conductive resin layer, and first and second conductive layers. A conductive filler includes a core portion and a silver coating film made of silver and covering the core portion. In a cross-section parallel to the first and second axes, when a straight line parallel to the first axis is drawn to pass through a range distant from a base end portion, and when a thickness of the first conductive layer along the line is a conductor thickness, and the sum of lengths of the silver coating film along the line in all the conductive fillers on the line is a total thickness of silver coating, a ratio of the conductor thickness to the total thickness of silver coating is 2 or more and 10 or less.

20 Claims, 5 Drawing Sheets

MULTI-LAYER CERAMIC ELECTRONIC COMPONENT AND CIRCUIT BOARD

CROSS-REFERENCE TO RELATED APPLICATIONS

This application claims the benefit of Japanese Application No. 2021-166169, filed Oct. 8, 2021, in the Japanese Patent Office. All disclosures of the document named above are incorporated herein by reference.

BACKGROUND ART

The present disclosure relates to a multi-layer ceramic electronic component and a circuit board.

Multi-layer ceramic electronic components such as multi-layer ceramic capacitors are also widely used in in-vehicle equipment with the trend toward electronic control of automobiles. For example, in the in-vehicle equipment, a circuit board on which a multi-layer ceramic electronic component is mounted is disposed under environments where vibration or temperature change is large. If the circuit board is deflected and deformed due to vibration or temperature change, the multi-layer ceramic electronic component also causes stress. For example, Japanese Patent Application Laid-open No. HEI 11-162771 discloses a multi-layer ceramic electronic component including an external electrode including a conductive epoxy thermosetting resin layer from the viewpoint of suppressing the occurrence of cracks resulting from such stress in a capacitor main body.

SUMMARY OF THE INVENTION

In addition, for example, the in-vehicle equipment may be in an environment where the humidity is very high and moisture condensation occurs on the surface of the multi-layer ceramic electronic component. In this case, the moisture attached to the surface intrudes into the external electrode, and ionized silver or the like elutes from metal powder included in the thermosetting resin layer in some cases. Thus, metal ions transfer through the surface of the multi-layer ceramic electronic component, and so-called migration occurs. If the migration occurs, insulation resistance of the multi-layer ceramic electronic component is reduced due to the metal ions, and an insulation failure occurs.

The material of the metal powder is expected to suppress the occurrence of the migration and also have good conductivity, like silver.

In view of the circumstances as described above, it is desirable to provide a multi-layer ceramic electronic component and a circuit board that are capable of suppressing migration of metal ions and that have good conductivity even in the case of including an external electrode including a conductive resin layer.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, according to one embodiment of the present disclosure, there is provided a multi-layer ceramic electronic component including a ceramic body and a pair of external electrodes.

The ceramic body includes a pair of main surfaces perpendicular to a first axis, a pair of end surfaces perpendicular to a second axis orthogonal to the first axis, a pair of side surfaces perpendicular to a third axis orthogonal to the first axis and the second axis, and a plurality of internal electrodes drawn to the pair of end surfaces, the ceramic body having a substantially rectangular parallelepiped shape.

The pair of external electrodes each include a base layer, a conductive resin layer, a first conductive layer, and a second conductive layer, the pair of external electrodes each extending along one of the pair of main surfaces from the end surface.

The base layer covers one of the pair of end surfaces.

The conductive resin layer includes a thermosetting resin and a plurality of conductive fillers scattered in the thermosetting resin and covers the base layer.

The first conductive layer is disposed on the conductive resin layer.

The second conductive layer includes tin as a main component and disposed on the first conductive layer.

The base layer includes a base end portion located inward in a direction of the second axis on the main surface.

The conductive resin layer includes an extended portion extending inward in the direction of the second axis from the base end portion on the main surface.

The conductive fillers each include a core portion and a silver coating film that is made of silver and covers the core portion.

In a cross-section that passes through the center portion of each of the pair of external electrodes in a direction of the third axis and is parallel to the first axis and the second axis, when a virtual straight line parallel to a direction of the first axis is drawn to pass through a range distant from the base end portion inward in the direction of the second axis by ½ or more and ⅔ or less of a dimension of the extended portion in the direction of the second axis, and when a thickness of the first conductive layer along the straight line is regarded as a conductor thickness, and the sum of lengths of the silver coating film along the straight line in all the conductive fillers through which the straight line passes, is regarded as a total thickness of silver coating, a ratio of the conductor thickness to the total thickness of silver coating is 2 or more and 10 or less.

In this configuration, the conductive filler includes the silver coating film, so that it is possible to reduce the content of silver in the conductive filler while the conductive filler maintains good conductivity. Further, setting the ratio of the conductor thickness to the total thickness of silver coating to 2 or more and 10 or less makes it possible to effectively suppress migration of silver ions while maintaining good conductivity of the external electrodes.

For example, the conductor thickness may be 1 μm or more and 10 μm or less, or may be 3 μm or more and 10 μm or less.

Further, the total thickness of silver coating may be 0.5 μm or more and 2.0 μm or less, and may be 1.0 μm or more and 1.5 μm or less.

Further, the ratio of the conductor thickness to the total thickness of silver coating may be 3 or more and 5 or less.

The core portion of the conductive filler may include copper or a copper alloy as a main component. This makes it possible to reduce the cost and obtain high conductivity.

The first conductive layer may include nickel or a nickel alloy as a main component. This makes it possible to enhance the wettability of solder at the time of mounting and enhance environment resistance.

The base layer may include copper as a main component. This makes it possible to reduce the stress on the ceramic body and also reduce an equivalent series resistance (ESR).

Alternatively, the base layer may have a double-layer structure including a sintered metal film including nickel as a main component, and a copper plating layer formed on the sintered metal film. This provides good connection between the sintered metal film disposed on the ceramic body and the internal electrodes, for which nickel is likely to be used. Further, forming the copper plating layer on the sintered metal film including nickel as a main component makes it possible to enhance the reliability of the electrical connection with the conductive resin layer.

The multi-layer ceramic electronic component may have a size in which a length dimension in the direction of the second axis is 1.0 mm or less, a width dimension in the direction of the third axis is 0.5 mm or less, and a height dimension in the direction of the first axis is 0.5 mm or less.

Further, the multi-layer ceramic electronic component may have a size in which the length dimension is 0.6 mm or less, the width dimension is 0.3 mm or less, and the height dimension is 0.3 mm or less.

In addition, the multi-layer ceramic electronic component may have a size in which the length dimension is 0.4 mm or less, the width dimension is 0.2 mm or less, and the height dimension is 0.2 mm or less.

With this configuration, the multi-layer ceramic electronic component can be downsized and can be mounted with high density on a substrate.

A mass ratio of silver in the conductive filler may be 3 percent by mass or more and 20 percent by mass or less.

Further, the mass ratio of silver in the conductive filler may be 5 percent by mass or more and 10 percent by mass or less.

The ceramic body may include calcium zirconate.

The ceramic body may include calcium zirconate titanate.

The ceramic body may include barium calcium zirconate titanate.

The ceramic body may include barium zirconate.

According to another embodiment of the present disclosure, there is provided a circuit board including a multi-layer ceramic electronic component and a mounting substrate including a connection electrode.

The multi-layer ceramic electronic component includes a ceramic body and a pair of external electrodes.

The ceramic body includes a pair of main surfaces perpendicular to a first axis, a pair of end surfaces perpendicular to a second axis orthogonal to the first axis, a pair of side surfaces perpendicular to a third axis orthogonal to the first axis and the second axis, and a plurality of internal electrodes drawn to the pair of end surfaces, the ceramic body having a substantially rectangular parallelepiped shape.

The pair of external electrodes each include a base layer, a conductive resin layer, a first conductive layer, and a second conductive layer, the pair of external electrodes each extending along one of the pair of main surfaces from the end surface.

The base layer covers one of the pair of end surfaces.

The conductive resin layer includes a thermosetting resin and a plurality of conductive fillers scattered in the thermosetting resin and covers the base layer.

The first conductive layer is disposed on the conductive resin layer.

The second conductive layer includes tin as a main component and disposed on the first conductive layer.

The base layer includes a base end portion located inward in a direction of the second axis on the main surface.

The conductive resin layer includes an extended portion extending inward in the direction of the second axis from the base end portion on the main surface.

The conductive fillers each include a core portion and a silver coating film that is made of silver and covers the core portion.

In a cross-section that passes through the center portion of each of the pair of external electrodes in a direction of the third axis and is parallel to the first axis and the second axis, w % ben a virtual straight line parallel to a direction of the first axis is drawn to pass through a range distant from the base end portion inward in the direction of the second axis by ½ or more and ⅔ or less of a dimension of the extended portion in the direction of the second axis, and when a thickness of the first conductive layer along the straight line is regarded as a conductor thickness, and the sum of lengths of the silver coating film along the straight line in all the conductive fillers through which the straight line passes, is regarded as a total thickness of silver coating, a ratio of the conductor thickness to the total thickness of silver coating is 2 or more and 10 or less.

According to the present disclosure, it is possible to provide a multi-layer ceramic electronic component and a circuit board that are capable of suppressing migration of metal ions and having good conductivity even in a case of including an external electrode including a conductive resin layer.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, embodiments of the present disclosure will be described with reference to the drawings.

In the figures, the X-axis, the Y-axis, and the Z-axis orthogonal to one another are shown as appropriate. The X-axis, the Y-axis, and the Z-axis are common in all figures.

1. Basic Configuration of Multi-Layer Ceramic Capacitor 10

Figure 1:
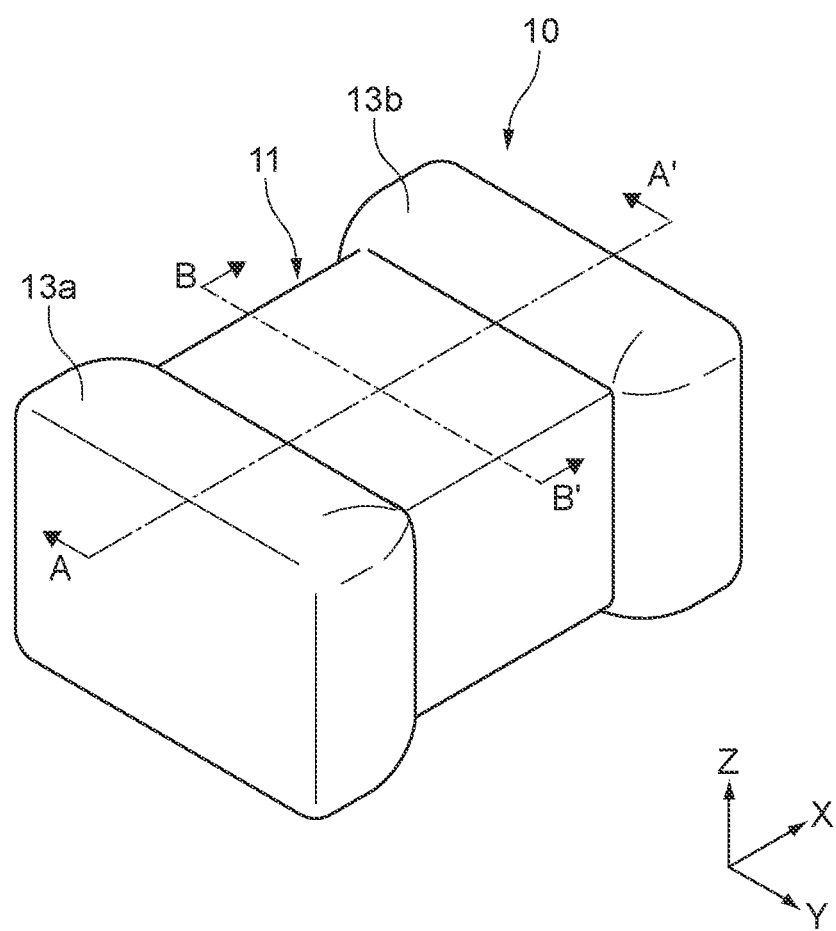
FIG. 1 is a perspective view of a multi-layer ceramic capacitor according to an embodiment of the present disclosure.
Figure 2:
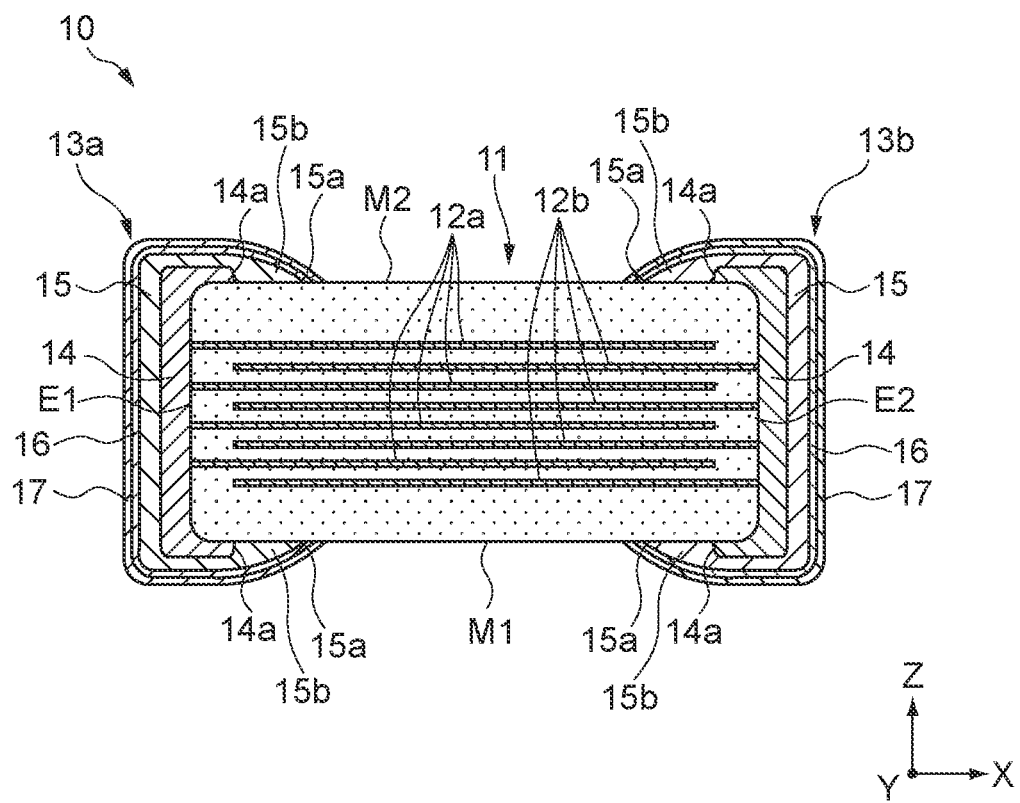
FIG. 2 is a cross-sectional view of the multi-layer ceramic capacitor taken along the line A-A' of FIG. 1.
Figure 3:
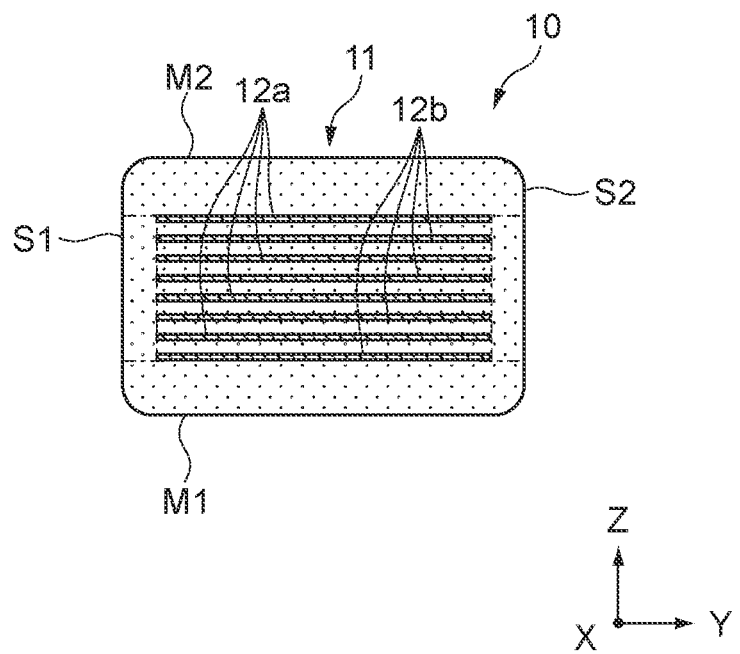
FIG. 3 is a cross-sectional view of the multi-layer ceramic capacitor taken along the line B-B' of FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the line A-A' of FIG. 1.

FIG. 3 is a cross-sectional view of the multi-layer ceramic capacitor 10 taken along the line B-B' of FIG. 1.

The multi-layer ceramic capacitor 10 includes a ceramic body 11, a first external electrode 13a, and a second external electrode 13b. The surface of the ceramic body 11 includes first and second end surfaces E1 and E2 perpendicular to the X-axis, first and second side surfaces S1 and S2 perpendicular to the Y-axis, and first and second main surfaces M1 and M2 perpendicular to the Z-axis. In other words, the ceramic body 11 has a substantially rectangular parallelepiped shape. It is favorable that the ceramic body 11 is chamfered and ridges connecting the surfaces of the ceramic body 11 are formed of rounded, curved surfaces.

The dimension of the multi-layer ceramic capacitor 10 is not particularly limited, but it may take the following range, for example. The maximum dimension of the multi-layer ceramic capacitor 10 in the X-axis direction (length dimension) is, for example, 0.25 mm or more and 4.5 mm or less. The maximum dimension of the multi-layer ceramic capacitor 10 in the Y-axis direction (width dimension) is, for example, 0.125 mm or more and 3.2 mm or less. The maximum dimension of the multi-layer ceramic capacitor 10 in the Z-axis direction (height dimension) is, for example, 0.125 mm or more and 3.2 mm or less. The multi-layer ceramic capacitor 10 has, for example, the size with the length dimension of 0.25 mm, the width dimension of 0.125 mm, and the height dimension of 0.125 mm, the size with the length dimension of 0.4 mm, the width dimension of 0.2 mm, and the height dimension of 0.2 mm, the size with the length dimension of 0.6 mm, the width dimension of 0.3 mm, and the height dimension of 0.3 mm, the size with the length dimension of 1.0 mm, the width dimension of 0.5 mm, and the height dimension of 0.5 mm, the size with the length dimension of 1.6 mm, the width dimension of 0.8 mm, and the height dimension of 0.8 mm, the size with the length dimension of 2.0 mm, the width dimension of 1.25 mm, and the height dimension of 1.25 mm, the size with the length dimension of 3.2 mm, the width dimension of 1.6 mm, and the height dimension of 1.6 mm, or the size with the length dimension of 4.5 mm, the width dimension of 3.2 mm, and the height dimension of 3.2 mm.

In the multi-layer ceramic capacitor 10, the first external electrode 13a covers the first end surface E1 of the ceramic body 11, and the second external electrode 13b covers the second end surface E2 of the ceramic body 11. The first and second external electrodes 13a and 13b face each other in the X-axis direction with the ceramic body 11 interposed therebetween and function as the terminals of the multi-layer ceramic capacitor 10.

The first and second external electrodes 13a and 13b extend from the first and second end surfaces E1 and E2, respectively, inward in the X-axis direction along the first and second main surfaces M1 and M2 and the first and second side surfaces S1 and S2 of the ceramic body 11. With this configuration, the first and second external electrodes 13a and 13b have U-shaped cross sections parallel to the X-Z plane shown in FIG. 2 and parallel to the X-Y plane.

Note that the phrase "inward in the X-axis direction" means a portion closer to a virtual Y-Z plane that bisects the multi-layer ceramic capacitor 10 in the X-axis direction. Meanwhile, the phrase "outward in the X-axis direction" means a portion farther from such a Y-Z plane.

The ceramic body 11 is formed of dielectric ceramics. The ceramic body 11 is formed by, for example, sintering a multi-layer unit of ceramic green sheets each obtained by forming ceramic slurry into a sheet shape.

The ceramic body 11 includes a plurality of first internal electrodes 12a and a plurality of second internal electrodes 12b that are covered with dielectric ceramics. The first and second internal electrodes 12a and 12b are formed by, for example, applying a conductive paste onto the ceramic green sheets, which constitute the internal layer portion of the multi-layer unit. Thus, the first and second internal electrodes 12a and 12b facing each other with the ceramic layers interposed therebetween are formed. In the example shown in FIGS. 2 and 3, the first and second internal electrodes 12a and 12b each have a sheet-like shape extending along the X-Y plane and are alternately disposed along the Z-axis direction.

The first internal electrodes 12a are drawn to the first end surface E1 and connected to the first external electrode 13a. The second internal electrodes 12b are drawn to the second end surface E2 and connected to the second external electrode 13b. With the configuration described above, when a voltage is applied between the first external electrode 13a and the second external electrode 13b in the multi-layer ceramic capacitor 10, the voltage is applied to the ceramic layers between the first and second internal electrodes 12a and 12b. Thus, the multi-layer ceramic capacitor 10 stores charge corresponding to the voltage applied between the first and second external electrodes 13a and 13b.

In the ceramic body 11, in order to increase a capacitance of each ceramic layer provided between the first and second internal electrodes 12a and 12b, dielectric ceramics having a high dielectric constant is used. The dielectric ceramics can mainly include, for example, a ceramic material having a perovskite structure represented by general formula $ABO_3$. Note that the perovskite structure may include $ABO_{3-\alpha}$ outside the stoichiometry. Examples of the ceramic material having a perovskite structure include a material including barium (Ba) and titanium (Ti), typified by barium titanate ($BaTiO_3$). Specifically, $Ba_{1-x-y}Ca_xSr_yTi_{1-z}Zr_zO_3$ ($0 \leq x \leq 1$, $0 \leq y \leq 1$, $0 \leq z \leq 1$) is included, for example.

Note that the dielectric ceramics may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium calcium zirconate titanate (($Ba, Ca)(Zr, Ti)O_3$), barium zirconate ($BaZrO_3$), titanium oxide ($TiO_2$), or the like.

2. Basic Configuration of First and Second External Electrodes 13a and 13b

The layer structure of the first and second external electrodes 13a and 13b will be described. In this embodiment, the first and second external electrodes 13a and 13b each include a base layer 14, a conductive resin layer 15, a first conductive layer 16, and a second conductive layer 17.

Note that, in the following description of the external electrodes, the first external electrode 13a on the first end surface E1 will be mainly described, but the second external electrode 13b on the second end surface E2 is also configured in a similar manner.

The base layer 14 covers the first end surface E1. With this configuration, the base layer 14 is electrically connected to the first internal electrodes 12a. In this embodiment, the base layer 14 extends in the X-axis direction from the first end surface E1 along the first and second main surfaces M1 and M2 and the first and second side surfaces S1 and S2. The base layer 14 includes base end portions 14a located inward in the X-axis direction on the first and second main surfaces M1 and M2.

In this embodiment, the base layer 14 is configured as a sintered metal film obtained by baking a conductive metal paste. For example, the main component of the base layer 14 can be any one of nickel (Ni), copper (Cu), palladium (Pd), and silver (Ag) and may be Cu, for example. Alternatively, the base layer 14 may have a double-layer structure in which a plating layer made of Cu or the like is formed on a sintered metal film mainly including Ni or the like.

Note that the "main component" in a certain layer means a component occupying the proportion of 50 percent by mass or more to the mass of the entire layer. Further, the metal as a main component may be included as an alloy thereof.

The conductive resin layer 15 covers the base layer 14. The conductive resin layer 15 has higher flexibility and deflection strength than the base layer 14, the first conductive layer 16, and the second conductive layer 17. The conductive resin layer 15 extends in the X-axis direction from the first end surface E1 along the first and second main surfaces M1 and M2 and the first and second side surfaces S1 and S2 and extends to the inward position in the X-axis direction relative to the base layer 14.

In other words, the conductive resin layer 15 includes, on the first and second main surfaces M1 and M2, extended portions 15b each extending inward in the X-axis direction from the base end portion 14a The extended portion 15b includes a resin end portion 15a located inward in the X-axis direction. For example, the extended portion 15b is configured to be gradually thicker in the Z-axis direction from the resin end portion 15a toward the base end portion 14a.

Figure 6:
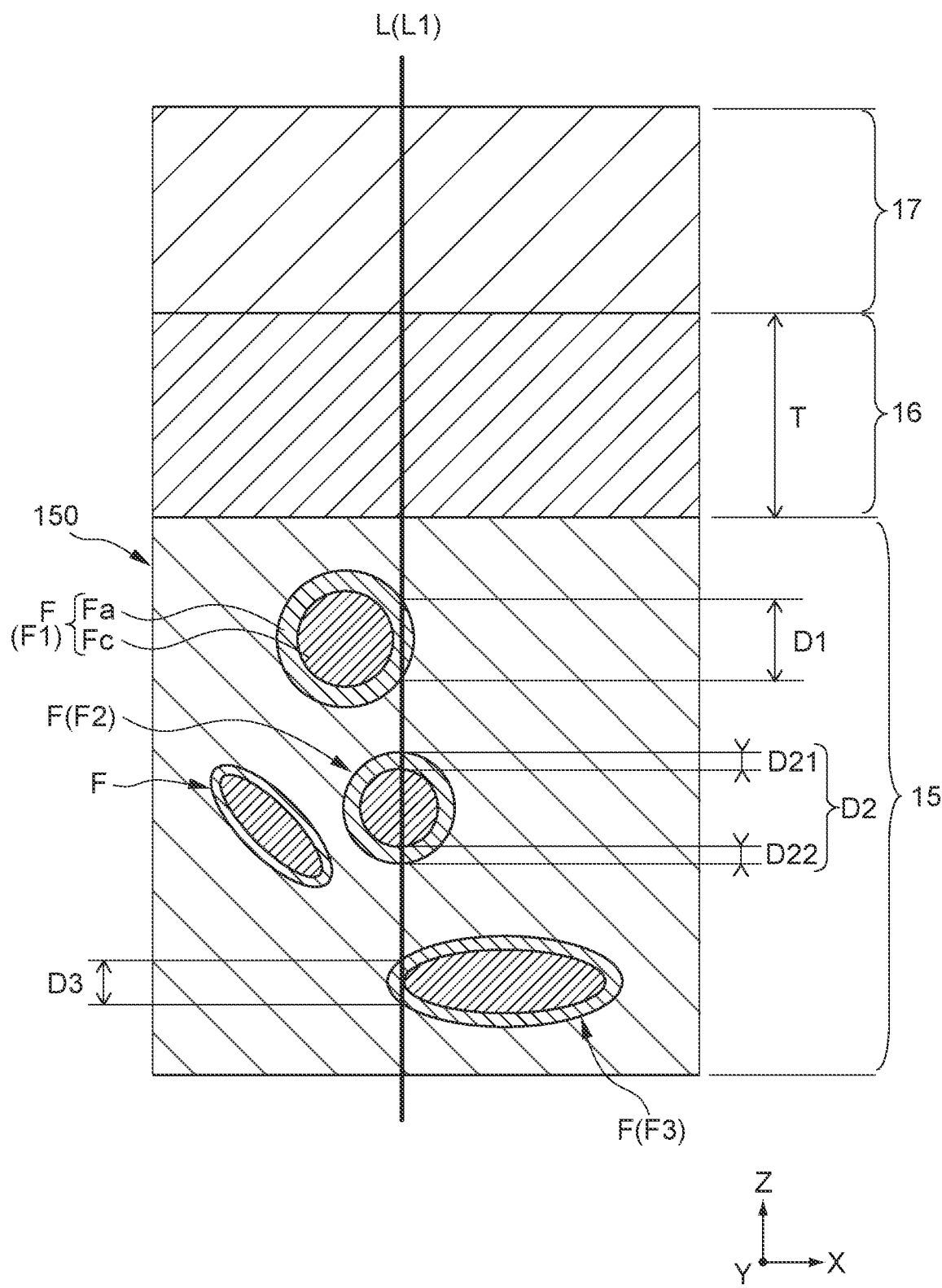
FIG. 6 is a partially enlarged view of FIG. 5.

As shown in the enlarged view of FIG. 6, the conductive resin layer 15 includes a thermosetting resin 150 and conductive fillers F scattered in the thermosetting resin 150. Examples of the thermosetting resin 150 include a phenol resin, an acrylic resin, a silicone resin, an epoxy resin, and a polyimide resin. The conductive fillers F are formed as metal powder including particles with a spherical shape, flattened shape, or acicular shape. The detailed configuration of the conductive resin layer 15 will be described later.

The conductive resin layer 15 is formed by, for example, applying an uncured thermosetting resin paste including the conductive fillers F onto the base layer 14 and then curing it by heat treatment. The thermosetting resin paste may include organic solvents, curing agents, and the like in addition to the conductive fillers F.

The first conductive layer 16 is disposed on the conductive resin layer 15. The first conductive layer 16 is a barrier layer disposed between the conductive resin layer 15 and the second conductive layer 17 so as to prevent the entire first external electrode 13a from being melted at the time of soldering. Further, the first conductive layer 16 favorably has functions of improving the wettability of solder and improving moisture resistance, for example. The first conductive layer 16 is formed by a wet plating method, for example.

The first conductive layer 16 has the functions described above and has high chemical stability, and thus the first conductive layer 16 favorably includes nickel (Ni) as a main component. If the first conductive layer 16 has a single-layer structure, the first conductive layer 16 is made of, for example, Ni or a Ni alloy. Note that the first conductive layer 16 may include a plurality of layers. In this case, the first conductive layer 16 may include, for example, a layer made of Cu or a Cu alloy and other layers, in addition to a layer made of Ni or a Ni alloy.

The second conductive layer 17 mainly include tin (Sn) and is disposed on the first conductive layer 16. The second conductive layer 17 is provided, for example, on the superficial layer of the first external electrode 13a so as to enhance the wettability of solder, and is formed by a wet plating method, for example.

In the multi-layer ceramic capacitor 10, for example, the first and second external electrodes 13a and 13b thus configured are soldered onto a mounting substrate 110, thus forming a circuit board 100.

3. Configuration of Circuit Board 100

Figure 4:
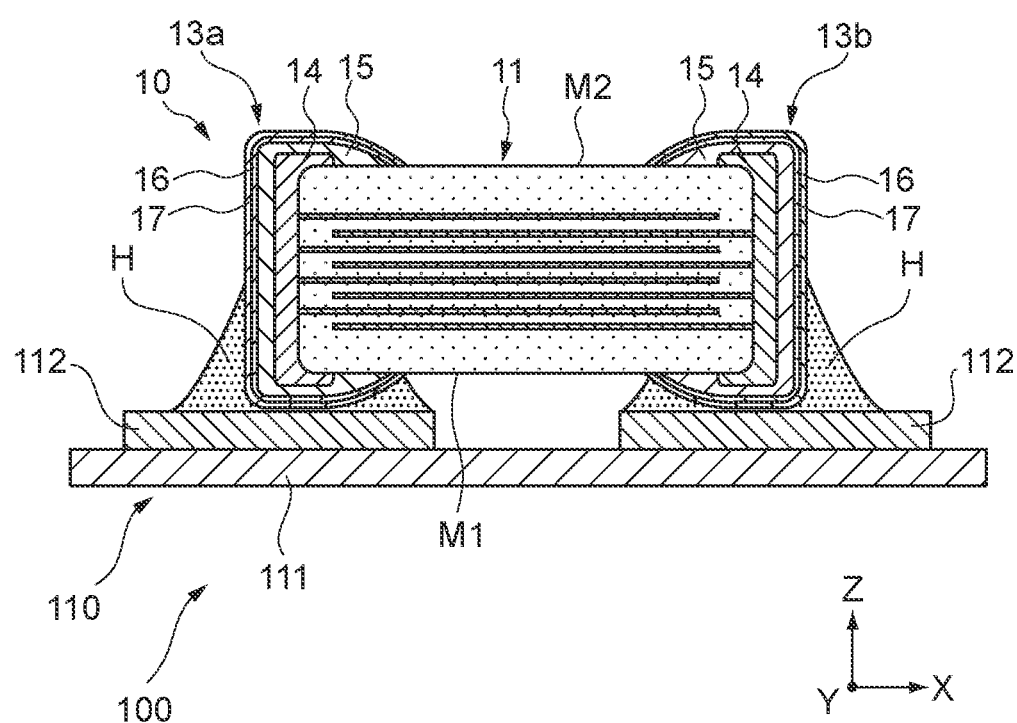
FIG. 4 is a cross-sectional view of a circuit board on which the multi-layer ceramic capacitor is mounted.

As shown in FIG. 4, the circuit board 100 includes the multi-layer ceramic capacitor 10 and the mounting substrate 110. The multi-layer ceramic capacitor 10 is mounted onto the mounting substrate 110 with the first main surface M1 and the regions of the first and second external electrodes 13a and 13b on the first main surface M1 facing the mounting substrate 110.

The mounting substrate 110 includes a substrate body 111 extending along the X-Y plane, and connection electrodes 112 provided on the substrate body 111. The two connection electrodes 112 are disposed corresponding to the first and second external electrodes 13a and 13b of the multi-layer ceramic capacitor 10.

In the production process of the circuit board 100, first, solder H is disposed on each of the connection electrodes 112 of the mounting substrate 110. The multi-layer ceramic capacitor 10 is disposed on the mounting substrate 110 in a state where the first main surface M1 of the ceramic body 11 faces the mounting substrate 110 and the positions of the first and second external electrodes 13a and 13b are aligned with the positions of the connection electrodes 112.

The mounting substrate 110 on which the multi-layer ceramic capacitor 10 is disposed is heated in a reflow furnace or the like, to melt the solder H on the connection electrodes 112. Thus, the solder H in the molten state wets and spreads along the surfaces of the connection electrodes 112 of the mounting substrate 110 and the first and second external electrodes 13a and 13b of the multi-layer ceramic capacitor 10. When the solder H is cooled and solidified, the multi-layer ceramic capacitor 10 is connected to the mounting substrate 110.

In this embodiment, part of the second conductive layer 17 including Sn as a main component is melt together with the solder H, so that the solder H and the first and second external electrodes 13a and 13b are reliably connected to each other. In addition, the first conductive layer 16 is disposed under the second conductive layer 17, so that the entire first and second external electrodes 13a and 13b can be prevented from being melted.

Such a circuit board 100 is mounted in an electronic apparatus to be used under various environments. For example, if the circuit board 100 is mounted in in-vehicle equipment, the circuit board 100 may be repeatedly deflected and deformed due to a large temperature change or vibration. In the multi-layer ceramic capacitor 10 of this embodiment, the first and second external electrodes 13a and 13b each include the conductive resin layer 15 having high flexibility. This configuration makes it possible for the conductive resin layer 15 to mitigate the stress when the deflection and deformation occur and to suppress the generation of cracks in the ceramic body 11, for example.

Further, the environment around the circuit board 100 in the in-vehicle equipment may be highly humid. In the environment in which humidity is very high, moisture condensation occurs on the surface of the multi-layer ceramic capacitor 10 along with the heat generation when the multi-layer ceramic capacitor 10 is used.

Here, in conventional multi-layer ceramic capacitors, conductive fillers including Ag as a main component have been often used as the conductive fillers included in the conductive resin layer of the external electrode. Ag has characteristics of high conductivity and high resistance to oxidation or the like. Meanwhile, under the environment as described above where moisture condensation occurs, Ag ions that may be derived from the conductive fillers seep into the surface of the multi-layer ceramic capacitor and transfer through the surface of the ceramic body, that is, so-called migration has occurred in some cases. If the migration occurs, a pair of external electrodes may be electrically connected to each other due to the influence of Ag ions diffused in the X-axis direction into the ceramic body. This may lead to a reduction in insulation resistance of the multi-layer ceramic electronic component and to an insulation failure.

According to the findings of the inventors of the present application, Ag ions seep from an unexpected, disconnected portion of the first conductive layer in some cases, but Ag ions often seep from the resin end portion, i.e., the end portion of the conductive resin layer that is located inward in the X-axis direction, through the gap between the plating layer and the ceramic body. Further, according to the experiments of the inventors of the present application, it has been found that, when a conductive resin layer including conductive fillers including only Ag is used, migration occurs almost certainly in a moisture condensation test to be described in Examples.

4. Detailed Configuration of First and Second External Electrodes 13a and 13b In this embodiment, as shown in FIG. 6, the conductive filler F included in the conductive resin layer 15 includes a core portion Fc and a silver (Ag) coating film Fa that is made of Ag and covers the core portion Fc. With this configuration, the conductive filler F can have a configuration with a smaller content of Ag while having characteristics of high conductivity and high resistance to oxidation because of Ag. Therefore, the amount of elution of Ag ions can be reduced, and migration can be suppressed.

The core portion Fc includes a material other than Ag. The core portion Fc may include, for example, a metal selected from Cu, Sn, Zn, or Ni, or an alloy thereof. From the viewpoint of reducing the cost and obtaining high conductivity, it is favorable that the core portion Fc includes Cu as a main component. In this case, the core portion Fc may be made of Cu only, or may be made of a Cu alloy including Zn or Ni. Further, the core portion Fc may include a material other than metal, and may include, for example, a silicon compound such as glass. In the conductive filler F of this embodiment, the Ag coating film Fa has high conductivity, and thus the configuration having conductivity as a whole may be provided even if the core portion Fc has low conductivity.

The mass ratio of Ag in the conductive filler F is favorably 3 percent by mass or more, more favorably 5 percent by mass or more, and is favorably 20 percent by mass or less, more favorably 10 percent by mass or less. Setting the mass ratio of Ag to 3 percent by mass or more makes it possible to satisfactorily ensure the conductivity of the conductive filler F. Setting the mass ratio of Ag to 20 percent by mass or less makes it possible to more effectively suppress the migration and to reduce the cost of the conductive fillers F.

Further, the studies of the inventors of the present application have revealed that the occurrence of migration and the insulation failure caused accordingly can be more reliably suppressed by setting the following ratio of the conductor thickness T to the total thickness of Ag coating $\Sigma Dn$ to 2 or more and 10 or less, in addition to use of the above-mentioned conductive fillers F. The total thickness of Ag coating $\Sigma Dn$ is a value relating to the thickness of the Ag coating film Fa, and the conductor thickness T is a value relating to the thickness of the first conductive layer 16.

A specific method of calculating the total thickness of Ag coating $\Sigma Dn$ and the conductor thickness T will be described. First, in the multi-layer ceramic capacitor 10, a cross-section passing through the center portion of the external electrodes 13a and 13b in the Y-axis direction and being parallel to the X-axis and the Z-axis is cut out. "The center portions of the first and second external electrodes 13a and 13b in the Y-axis direction" means the center region obtained when the first and second external electrodes 13a and 13b are each divided into three in the Y-axis direction. Such a cross-section is favorably a cross-section that almost bisects the first and second external electrodes 13a and 13b in the Y-axis direction, like the cross-section shown in FIG. 2.

Figure 5:
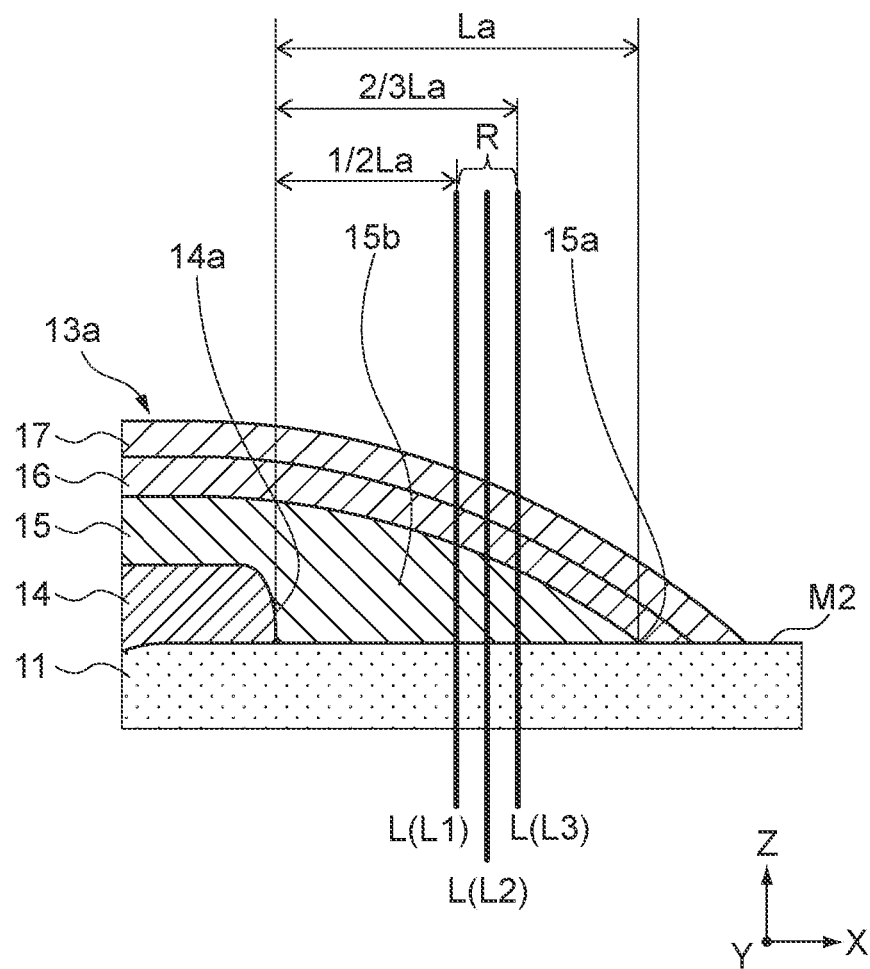
FIG. 5 is a partially enlarged view of FIG. 2.

FIG. 5 is a partially enlarged view of FIG. 2. As shown in FIG. 5, a virtual straight line L parallel to the Z-axis direction is drawn on the above-mentioned cross-section. The virtual straight line L passes through a region R distant from the base end portion 14a inward in the X-axis direction by a predetermined distance. The straight line L defines a measurement position for the total thickness of Ag coating $\Sigma Dn$ and the conductor thickness T and passes across the extended portion 15b of the conductive resin layer 15, the first conductive layer 16, and the like in the Z-axis direction.

Further, as described above, the extended portion 15b of the conductive resin layer 15 gradually becomes thicker from the resin end portion 15a toward the base end portion 14a. In this embodiment, the distance in the X-axis direction from the base end portion 14a to the region R is set to ½ or more and ⅔ or less of a dimension La. This makes it possible to calculate the total thickness of Ag coating $\Sigma Dn$ of the region R, which is located relatively close to the resin end portion 15a having a problem of seeping of Ag ions and has a sufficient thickness, in the extended portion 15b of the conductive resin layer 15.

In addition, in order to enhance the accuracy of measured values of the total thickness of Ag coating $\Sigma Dn$ and the conductor thickness T, in this embodiment, three or more straight lines L are drawn in the region R, and the total thickness of Ag coating $\Sigma Dn$ and the conductor thickness T are calculated for each of the straight lines L to calculate a mean value thereof. In the example shown in FIG. 5, for example, three straight lines L1, L2, and L3 are drawn as the straight lines L. Note that the straight lines L1, L2, and L3 are favorably disposed at almost regular intervals in the X-axis direction. It is more favorable that, for example, the straight line L1 passes through the position at approximately ½ of the dimension La from the base end portion 14a, the straight line L2 passes through the position at approximately 7/12 of the dimension La from the base end portion 14a, and the straight line L3 passes through the position at approximately ⅔ of the dimension La from the base end portion 14a.

Subsequently, the sum of the lengths of the Ag coating film Fa along the straight line L of all the conductive fillers F located on the straight line L is calculated as the total thickness of Ag coating $\Sigma Dn$. Here, the sum of the lengths of the Ag coating film Fa along each of the three straight lines L1. L2, and L3 is calculated, and a mean value thereof is assumed as the total thickness of Ag coating ΣDn. Note that the total thickness of Ag coating ΣDn is calculated for the conductive resin layer 15*b* on one of the first and second main surfaces M1 and M2.

With reference to FIG. 6, the method of calculating the sum of the lengths of the Ag coating films Fa on the single straight line L1 will be described. FIG. 6 is an enlarged view of the straight line L1 shown in FIG. 5 and the periphery thereof. Note that in FIG. 5 the upper surface in the Z-axis direction of each layer of the first external electrode 13*a* is inclined, but in FIG. 6, the upper surface in the Z-axis direction of each layer is shown as a flat surface for the purpose of convenience.

In the example shown in FIG. 6, three conductive fillers F1, F2, and F3 are disposed on the straight line L1. The conductive fillers F1, F2, and F3 have the respective lengths of the Ag coating film Fa along the straight line L1, i.e., the lengths D1, D2, and D3. For example, if the Ag coating film Fa is disposed at two locations on the straight line L1 with the core portion Fc interposed therebetween, like the conductive filler F2, the sum of the lengths D21 and D22 of the respective portions of the Ag coating film Fa along the straight line L1 is set to the length D2 of the conductive filler F2. The sum of the lengths D1, D2, and D3 of all the conductive fillers F1, F2, and F3 is then calculated as the sum of the lengths of the Ag coating film Fa along the straight line L1.

Note that FIG. 6 shows the example in which the three conductive fillers F are disposed on the straight line L1, but actually more conductive fillers F are disposed.

Similarly, the sum of the lengths of the Ag coating film Fa along each of the straight lines L2 and L3 is also calculated. The mean value of the sums of the lengths of the Ag coating film Fa along the three straight line L1, L2, and L3 is then calculated as the total thickness of Ag coating ΣDn.

Subsequently, as shown in FIG. 6, the thickness of the first conductive layer 16 along the straight line L is calculated as the conductor thickness T. In FIG. 6, the thickness of the first conductive layer 16 along the single straight line L1 is assumed as the conductor thickness T for the purpose of description. However, in the example shown in FIG. 5, the mean value of the thicknesses of the first conductive layer 16 along the three straight lines L1, L2, and L3 is assumed as the conductor thickness T. Note that the conductor thickness T is the thickness of the first conductive layer 16 adjacent to the conductive resin layer 15 to be measured.

Setting the ratio of the conductor thickness T to the total thickness of Ag coating ΣDn to 2 or more makes it possible to effectively suppress migration, as will be described later in Examples. This is probably because the elution of Ag through the first conductive layer 16 or through the gap between the first conductive layer 16 and the ceramic body 11 is suppressed.

Further, setting the ratio of the conductor thickness T to the total thickness of Ag coating ΣDn to 10 or less makes it possible to sufficiently ensure the amount of Ag in the conductive resin layer 15 and the conductivity of the conductive resin layer 15.

In addition, it is favorable that the ratio of the conductor thickness T to the total thickness of Ag coating ΣDn is 3 or more and 5 or less. If the ratio is set to 3 or more, the effect of suppressing migration can be obtained more reliably. If the ratio is set to 5 or less, the conductivity of the conductive resin layer 15 can be enhanced more.

Moreover, the conductor thickness T is favorably 1 μm or more and 10 μm or less, more favorably 3 μm or more and 10 μm or less. If the conductor thickness T is set to 1 μm or more, and further 3 μm or more, the effect of suppressing migration can be obtained more reliably. With this configuration, the wettability of solder can be sufficiently ensured, and sufficient moisture resistance can be obtained. Further, if the conductor thickness T is set to 10 μm or less, the amount of storage of the hydrogen, generated in the wet plating step, in the first and second external electrodes 13*a* and 13*b* can be reduced. Therefore, it is possible to prevent the stored hydrogen from being diffused into the ceramic body 11 to reduce the insulation resistance of the multi-layer ceramic capacitor 10 after the production.

Further, the total thickness of Ag coating ΣDn is favorably 0.5 μm or more and 2.0 μm or less, more favorably 1.0 μm or more and 1.5 μm or less. If the total thickness of Ag coating ΣDn is set to 0.5 μm or more, and further 1.0 μm or more, sufficient conductivity of the conductive resin layer 15 can be ensured, and the increase in ESR can be suppressed. If the total thickness of Ag coating ΣDn is set to 2.0 μm or less, and further 1.5 μm or less, the amount of Ag in the conductive fillers F can be reduced, and migration can be sufficiently suppressed.

5. Examples and Comparative Examples

Examples and Comparative examples of the embodiment will be described. In Examples 1 to 15, the samples of the multi-layer ceramic capacitor 10 were produced on the condition that the ratio T/ΣDn is set to 2 or more and 10 or less. Further, in Comparative examples 1 to 8, the samples of the multi-layer ceramic capacitor 10 were produced on the condition that the ratio T/ΣDn is less than 2 or more than 10.

In each of Examples 1 to 15 and Comparative examples 1 to 8, the size of the sample of the multi-layer ceramic capacitor 10 was set to 1.6 mm×0.8 mm×0.8 mm. Further, in Examples 1 to 15 and Comparative examples 1 to 8, the configuration of the sample of the multi-layer ceramic capacitor was substantially similar to one another except for the filler content of the conductive resin layer or the thickness of the first conductive layer.

The production method common in Examples 1 to 15 and Comparative examples 1 to 8 will be described. First, a ferroelectric material such as $BaTiO_3$ was used to produce ceramic green sheets. Internal electrode patterns were formed on the ceramic green sheets by a printing method or the like. A predetermined number of ceramic green sheets on which the internal electrode patterns were formed, and a predetermined number of ceramic green sheets on which no internal electrode patterns were formed were laminated to create a large-sized multi-layer unit. The multi-layer unit was pressure-bonded and cut at predetermined positions, to prepare an unsintered ceramic body. The ceramic body was sintered at a temperature of 1000 to 1400° C., thus forming a sintered ceramic body.

A conductive paste including Cu as a main component was applied to the entire end surfaces of the sintered ceramic body and to a part of the main and side surfaces thereof. The multi-layer chip to which the conductive paste was applied was baked at a temperature of 700 to 1000° C. to form a base layer on the ceramic body.

Subsequently, a conductive resin paste, in which conductive fillers were added to an uncured epoxy and phenol resin paste, was applied in the form of covering the base layer as shown in FIGS. 1 to 3, to form an uncured conductive resin layer. The conductive filler was one including a core portion made of a Cu alloy including Ni in the main component of Cu, and a Ag coating film made of Ag. The conductive filler was one including 8 percent by mass of Ag. In Examples 1 to 15 and Comparative examples 1 to 8, the amount of conductive fillers added to the resin paste was adjusted in order to obtain the total thickness of Ag coating $\Sigma Dn$ as shown in Table 1.

Heat treatment for curing the uncured conductive resin layer was performed. The heat treatment was performed by heating the ceramic body 11, on which the uncured conductive resin layer was formed, at a temperature of 160 to 190° C. in an oven having a nitrogen atmosphere. Thus, the conductive resin layer was formed.

Subsequently, a first conductive layer made of Ni and a second conductive layer made of Sn were formed on the conductive resin layer by an electrolytic plating method. In Examples 1 to 15 and Comparative examples 1 to 8, a plating forming condition for the first conductive layer was adjusted in order to obtain the conductor thickness T as shown in Table 1.

Thus, the samples of the multi-layer ceramic capacitor were produced. Table 1 shows the values of the conductor thickness T, the total thickness of Ag coating $\Sigma Dn$, and the ratio T/$\Sigma Dn$ in Examples 1 to 15 and Comparative examples 1 to 8. The conductor thickness T and the total thickness of Ag coating $\Sigma Dn$ were obtained by drawing the three straight lines in the range distant from the base end portion by ½ or more and ⅔ or less of the length of the extended portion, and calculating the mean value of the thicknesses of the first conductive layer and the mean value of the sums of the lengths of the Ag coating film for the respective straight lines as described above.

Twenty samples were prepared for each of Examples 1 to 15 and Comparative examples 1 to 8 to perform a moisture condensation test. The sample was mounted onto a substrate by solder, put into a thermohygrostat bath under application of a voltage of 16 V, and subjected to a moisture condensation test program of JIS60068-2-30 by six cycles. The conditions for one cycle were the flowing (1) to (6).

(1) Maintain the humidity of 98% and change the temperature from 25° C. to 55° C. in 3 hours
(2) Maintain the temperature of 55° C. and change the humidity from 98% to 93% in 15 minutes
(3) Hold the temperature of 55° C. and the humidity of 93% for 9 hours and 25 minutes
(4) Maintain the humidity of 93% and change the temperature from 55° C. to 25° C. in 3 hours
(5) Hold the temperature of 25° C. and the humidity of 93% for 3 hours
(6) Maintain the temperature of 25° C. and change the humidity from 93% to 98% in 5 hours and 30 minutes The occurrence of migration was found in the samples of Examples 1 to 15 and Comparative examples 1 to 8 subjected to the moisture condensation test. The migration was determined from the outer appearance of the sample by checking if deposits were found between the external electrodes using a stereoscopic microscope at 40× magnification. If deposits were found, the occurrence of migration was determined. Table 1 shows the ratio of the samples in which migration occurred to the 20 samples in each of Examples 1 to 15 and Comparative examples 1 to 8.

As shown in Table 1, in Comparative examples 1 to 3 and 7 in which the ratio T/$\Sigma Dn$ is less than 2, there were sample in which migration occurred. On the other hand, in

TABLE 1

| Sample name | Conductor thickness T(μm) | Total thickness of Ag coating $\Sigma Dn$(μm) | T/$\Sigma Dn$ | Migration occurrence ratio | Conductivity defect ratio | Plating degradation defect ratio |
|---|---|---|---|---|---|---|
| Example 1 | 3 | 0.5 | 6 | 0/20 | 0/20 | 0/20 |
| Example 2 | 3 | 1 | 3 | 0/20 | 0/20 | 0/20 |
| Example 3 | 3 | 1.5 | 2 | 0/20 | 0/20 | 0/20 |
| Comparative example 1 | 3 | 2.5 | 1.2 | 1/21 | 0/20 | 0/20 |
| Example 4 | 5 | 0.5 | 10 | 0/20 | 0/20 | 0/20 |
| Example 5 | 5 | 1 | 5 | 0/20 | 0/20 | 0/20 |
| Example 6 | 5 | 1.5 | 3.3 | 0/20 | 0/20 | 0/20 |
| Example 7 | 7 | 1 | 7 | 0/20 | 0/20 | 0/20 |
| Example 8 | 7 | 1.5 | 4.7 | 0/20 | 0/20 | 0/20 |
| Example 9 | 7 | 2 | 3.5 | 0/20 | 0/20 | 0/20 |
| Example 10 | 10 | 1 | 10 | 0/20 | 0/20 | 0/20 |
| Example 11 | 10 | 1.5 | 6.7 | 0/20 | 0/20 | 0/20 |
| Example 12 | 10 | 2 | 5 | 0/20 | 0/20 | 0/20 |
| Example 13 | 1 | 0.5 | 2 | 0/20 | 0/20 | 0/20 |
| Comparative example 2 | 1 | 1 | 1 | 2/20 | 0/20 | 0/20 |
| Comparative example 3 | 1 | 1.5 | 0.7 | 4/20 | 0/20 | 0/20 |
| Comparative example 4 | 3 | 0.2 | 15 | 0/20 | 6/20 | 0/20 |
| Comparative example 5 | 5 | 0.2 | 25 | 0/20 | 4/20 | 0/20 |
| Example 14 | 5 | 2 | 2.5 | 0/20 | 0/20 | 0/20 |
| Comparative example 6 | 7 | 0.5 | 14 | 0/20 | 0/20 | 0/20 |
| Comparative example 7 | 7 | 5 | 1.4 | 2/20 | 0/20 | 0/20 |
| Comparative example 8 | 15 | 1 | 15 | 0/20 | 0/20 | 2/20 |
| Example 15 | 15 | 2 | 7.5 | 0/20 | 0/20 | 1/21 |

Examples 1 to 15 and Comparative example 4 to 6 and 8 in which the ratio T/ΣDn is 2 or more, there were no samples in which migration occurred.

The conductivity was evaluated for 20 samples prepared for each of Examples 1 to 15 and Comparative examples 1 to 8. After the samples were left under the high-temperature and high-humidity environment at a temperature of 85° C. and a humidity of 85% for 1000 hours, an equivalent series resistance (ESR) was measured for each sample. When the minimum value of the ESR was increased to five times or more as large as the minimum value of the initial ESR, the sample was detected as "conductivity defect". Table 1 shows the ratio of the conductivity defect occurrence to the 20 samples of each of Examples 1 to 15 and Comparative examples 1 to 8.

As shown in Table 1, in Comparative example 4 and 5 in which the ratio T/ΣDn is larger than 10, there were samples determined as conductivity defect. On the other hand, in Examples 1 to 15 and Comparative example 1 to 3 and 7 in which the ratio T/ΣDn is 10 or less, there were no samples determined as conductivity defect.

The degradation due to plating was evaluated for 20 samples prepared for each of Examples 1 to 15 and Comparative examples 1 to 8. After the samples were mounted using solder, and a direct current (DC) bias, which is 1.5 times as large as the rated current, was applied to the samples in a thermostat bath at a temperature of 125° C. for 1000 hours, insulation resistance was measured for each sample. When the insulation resistance was 2.5 MΩ·μF or less, the sample was detected as "plating degradation defect". Table 1 shows the ratio of the plating degradation defect occurrence to the 20 samples of each of Examples 1 to 15 and Comparative examples 1 to 8.

As shown in Table 1, in Comparative example 8 and Examples 15 in which the conductor thickness T is 15 μm, there were samples determined as plating degradation defect. On the other hand, in Examples 1 to 14 and Comparative example 1 to 7 in which the conductor thickness T is 10 μm or less, there were no samples determined as plating degradation defect.

From those results, it has been found that, in Examples 1 to 15 in which the T/ΣDn is 2 or more and 10 or less, the occurrence of migration is suppressed and sufficient conductivity is obtained. Further, it has been found that when the total thickness of Ag coating ΣDn is 0.5 μm or more and 2.0 μm or less, the ratio T/ΣDn is easily adjusted to 2 or more and 10 or less, and thus the occurrence of migration is suppressed and sufficient conductivity is easily obtained. In addition, it has been found that setting the conductor thickness T to 10 μm or less makes it possible to suppress the occurrence of a plating degradation defect. Note that in Examples 1 to 15 and Comparative examples 1 to 8 in which the conductor thickness T is 1 μm or more, the first conductive layer made of Ni was formed to be substantially continuous, and there were no problems such as solder leakage and moisture resistance.

6. Other Embodiments

While the embodiment of the present disclosure has been described, the present disclosure is not limited to the embodiment described above, and it should be appreciated that the present disclosure may be variously modified.

The first and second external electrodes 13a and 13b only need to extend from the first and second end surfaces E1 and E2 to at least one main surface (the first main surface M1), and are not necessarily formed on the second main surface M2 and/or the first and second side surfaces S1 and S2.

The first and second internal electrodes 12a and 12b are not limited to be alternately disposed along the Z-axis direction, and may be alternately disposed in the Y-axis direction, for example.

The multi-layer ceramic capacitor according to this embodiment is not limited to be of a two-terminal type, and can also be configured to be of a three-terminal type.

Further, the present disclosure is applicable not only to the multi-layer ceramic capacitors but also to any other multi-layer ceramic electronic components each having a configuration in which the internal electrodes are laminated. Examples of such multi-layer ceramic electronic components to which the present disclosure is applicable include a chip varistor, a chip thermistor, and a multi-layer inductor, in addition to the multi-layer ceramic capacitors.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic electronic component, comprising:
   a ceramic body including
      a pair of main surfaces perpendicular to a first axis,
      a pair of end surfaces perpendicular to a second axis orthogonal to the first axis,
      a pair of side surfaces perpendicular to a third axis orthogonal to the first axis and the second axis, and
      a plurality of internal electrodes drawn to the pair of end surfaces,
   the ceramic body having a substantially rectangular parallelepiped shape, and
   a pair of external electrodes each including
      a base layer that covers one of the pair of end surfaces,
      a conductive resin layer that includes a thermosetting resin and a plurality of conductive fillers scattered in the thermosetting resin and covers the base layer,
      a first conductive layer disposed on the conductive resin layer, and
      a second conductive layer including tin as a main component and disposed on the first conductive layer,
   the pair of external electrodes each extending along one of the pair of main surfaces from the end surface, wherein
   the base layer includes a base end portion located inward in a direction of the second axis on the main surface,
   the conductive resin layer includes an extended portion extending inward in the direction of the second axis from the base end portion on the main surface,
   the conductive fillers each include a core portion and a silver coating film that is made of silver and covers the core portion, and
   in a cross-section that passes through the center portion of each of the pair of external electrodes in a direction of the third axis and is parallel to the first axis and the second axis, when a virtual straight line parallel to a direction of the first axis is drawn to pass through a range distant from the base end portion inward in the direction of the second axis by ½ or more and ⅔ or less of a dimension of the extended portion in the direction of the second axis, and when a thickness of the first conductive layer along the straight line is regarded as a conductor thickness, and the sum of lengths of the silver coating film along the straight line in all the conductive fillers through which the straight line passes, is regarded as a total thickness of silver coating, a ratio of the conductor thickness to the total thickness of silver coating is 2 or more and 10 or less.

2. The multi-layer ceramic electronic component according to claim 1, wherein
the conductor thickness is 1 μm or more and 10 μm or less.

3. The multi-layer ceramic electronic component according to claim 2, wherein
the conductor thickness is 3 μm or more and 10 μm or less.

4. The multi-layer ceramic electronic component according to claim 1, wherein
the total thickness of silver coating is 0.5 μm or more and 2.0 μm or less.

5. The multi-layer ceramic electronic component according to claim 4, wherein
the total thickness of silver coating is 1.0 μm or more and 1.5 μm or less.

6. The multi-layer ceramic electronic component according to claim 1, wherein
the ratio of the conductor thickness to the total thickness of silver coating is 3 or more and 5 or less.

7. The multi-layer ceramic electronic component according to claim 1, wherein
the core portion of the conductive filler includes copper as a main component.

8. The multi-layer ceramic electronic component according to claim 1, wherein
the first conductive layer includes nickel as a main component.

9. The multi-layer ceramic electronic component according to claim 1, wherein
the base layer includes copper as a main component.

10. The multi-layer ceramic electronic component according to claim 1, wherein
the base layer has a double-layer structure including a sintered metal film including nickel as a main component, and a copper plating layer formed on the sintered metal film.

11. The multi-layer ceramic electronic component according to claim 1, which has a size in which a length dimension in the direction of the second axis is 1.0 mm or less, a width dimension in the direction of the third axis is 0.5 mm or less, and a height dimension in the direction of the first axis is 0.5 mm or less.

12. The multi-layer ceramic electronic component according to claim 11, which has a size in which the length dimension is 0.6 mm or less, the width dimension is 0.3 mm or less, and the height dimension is 0.3 mm or less.

13. The multi-layer ceramic electronic component according to claim 12, which has a size in which the length dimension is 0.4 mm or less, the width dimension is 0.2 mm or less, and the height dimension is 0.2 mm or less.

14. The multi-layer ceramic electronic component according to claim 1, wherein
a mass ratio of silver in the conductive filler is 3 percent by mass or more and 20 percent by mass or less.

15. The multi-layer ceramic electronic component according to claim 14, wherein
the mass ratio of silver in the conductive filler is 5 percent by mass or more and 10 percent by mass or less.

16. The multi-layer ceramic electronic component according to claim 1, wherein
the ceramic body includes calcium zirconate.

17. The multi-layer ceramic electronic component according to claim 1, wherein
the ceramic body includes calcium zirconate titanate.

18. The multi-layer ceramic electronic component according to claim 1, wherein
the ceramic body includes barium calcium zirconate titanate.

19. The multi-layer ceramic electronic component according to claim 1, wherein
the ceramic body includes barium zirconate.

20. A circuit board, comprising:
a multi-layer ceramic electronic component; and
a mounting substrate including a connection electrode,
the multi-layer ceramic electronic component including
a ceramic body including
a pair of main surfaces perpendicular to a first axis,
a pair of end surfaces perpendicular to a second axis orthogonal to the first axis,
a pair of side surfaces perpendicular to a third axis orthogonal to the first axis and the second axis, and
a plurality of internal electrodes drawn to the pair of end surfaces,
the ceramic body having a substantially rectangular parallelepiped shape, and
a pair of external electrodes each including
a base layer that covers one of the pair of end surfaces,
a conductive resin layer that includes a thermosetting resin and a plurality of conductive fillers scattered in the thermosetting resin and covers the base layer,
a first conductive layer disposed on the conductive resin layer, and
a second conductive layer including tin as a main component and disposed on the first conductive layer,
the pair of external electrodes each extending along one of the pair of main surfaces from the end surface, wherein
the base layer includes a base end portion located inward in the second axis on the main surface,
the conductive resin layer includes an extended portion extending inward in the direction of the second axis from the base end portion on the main surface,
the conductive fillers each include a core portion and a silver coating film that is made of silver and covers the core portion, and
in a cross-section that passes through the center portion of each of the pair of external electrodes in a direction of the third axis and is parallel to the first axis and the second axis, when a virtual straight line parallel to a direction of the first axis is drawn to pass through a range distant from the base end portion inward in the direction of the second axis by ½ or more and ⅔ or less of a dimension of the extended portion in the direction of the second axis, and when a thickness of the first conductive layer along the straight line is regarded as a conductor thickness, and the sum of lengths of the silver coating film along the straight line in all the conductive fillers through which the straight line passes, is regarded as a total thickness of silver coating, a ratio of the conductor thickness to the total thickness of silver coating is 2 or more and 10 or less.

* * * * *